Nov. 7, 1961  F. WAY  3,007,584
WHEELED ANCHORABLE ROTARY CARRIER
Filed June 10, 1958  2 Sheets-Sheet 1

INVENTOR.
Frederick Way
BY
Munn, Liddy, Daniels & March
ATTORNEYS

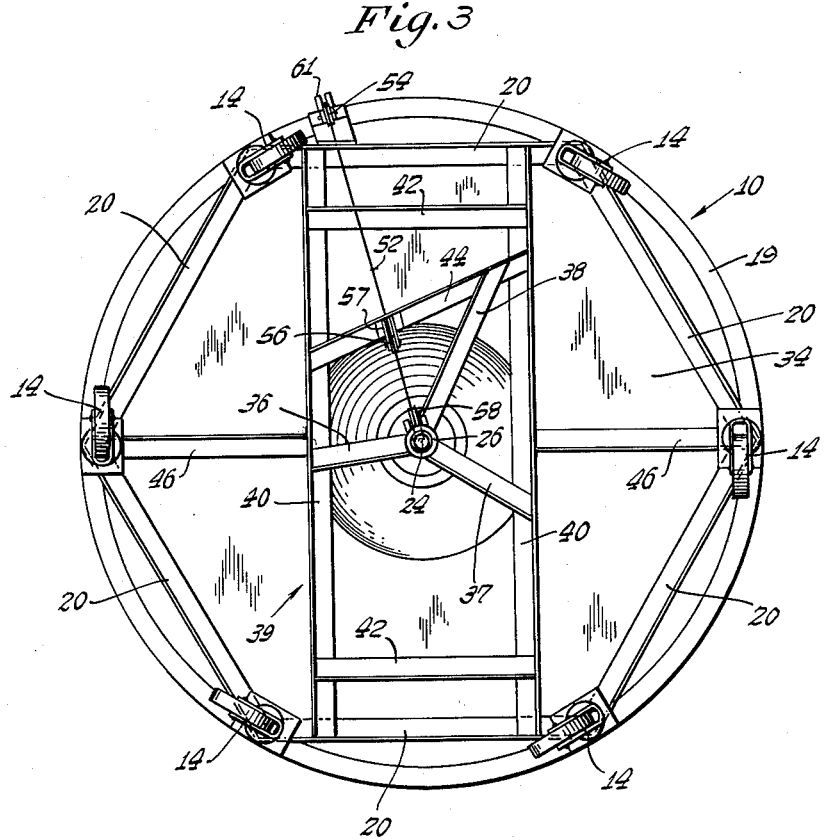

United States Patent Office 3,007,584
Patented Nov. 7, 1961

3,007,584
WHEELED ANCHORABLE ROTARY CARRIER
Frederick Way, Brooklyn, N.Y., assignor to
St. Luke's Hospital, New York, N.Y.
Filed June 10, 1958, Ser. No. 741,077
12 Claims. (Cl. 214—1)

This invention relates to movable carriers which are adapted to support and carry various goods and equipment so as to facilitate the handling and/or processing of the same.

The carrier illustrated herein has special utility as a laundry dump and carrier table, although it should be understood that the invention is not to be limited to this use.

An object of the present invention is to provide a novel and improved, wheeled, laterially movable and anchorable rotary carrier for supporting and carrying laundry and other dry goods and the like, which carrier is so arranged and oganized that it may be readily anchored at one location to a floor and rotated about the anchorage means, or else rolled over the floor to different locations thereon, all for the purpose of facilitating the handling and/or processing of goods supported by the carrier.

A further object of the invention is to provide a novel and improved combination with a floor and anchorage means thereof, of a rotatable and travelling rotary carrier as above characterized.

Yet another object of the invention is to provide an improved carrier, floor and anchorage combination as above set forth, which permits of extremely quick and convenient operation in shifting the carrier to various locations or else in pivotally anchoring the carrier at one given location on the floor.

A feature of the invention resides in the provision of an improved carrier and floor structure in accordance with the foregoing, which is extremely simple in its construction and economical to fabricate.

Another feature of the invention resides in the provision of an improved carrier structure adapted for both shifting and rotary movement as above outlined, which is sturdy and reliable in its construction, and able to support and transport relatively heavy loads in spite of its comparative simplicity and relatively low cost.

Other features and advantages will hereinafter appear.

In the drawings accompanying this specification, similar characters of reference are used to designate like components throughout the several views, in which:

FIG. 3 is a bottom plan view of the carrier construction shown in FIGS. 1 and 2.

Figure 1:
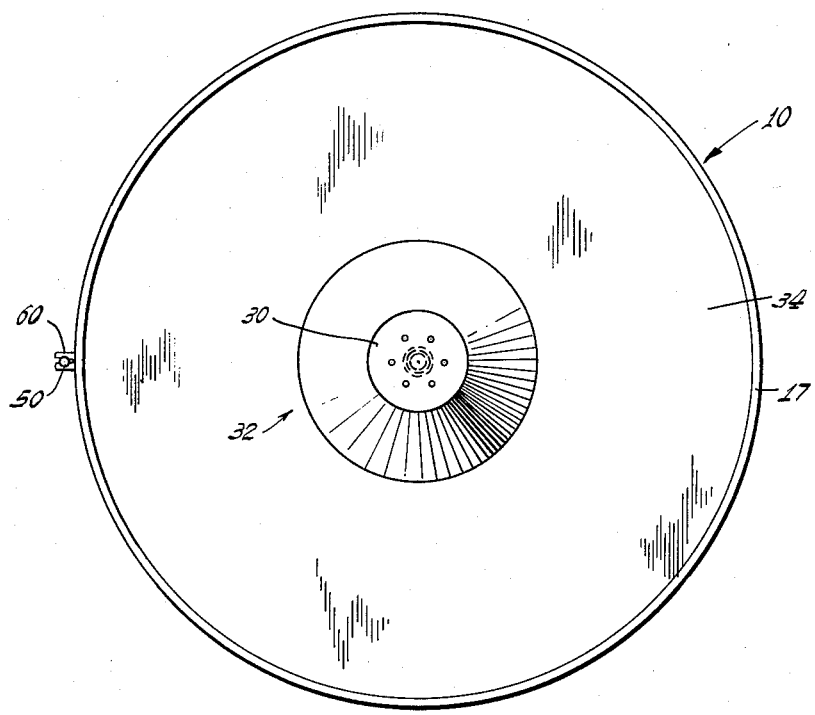
FIGURE 1 is a top plan view of the improved rotary carrier construction of the present invention.
Figure 2:
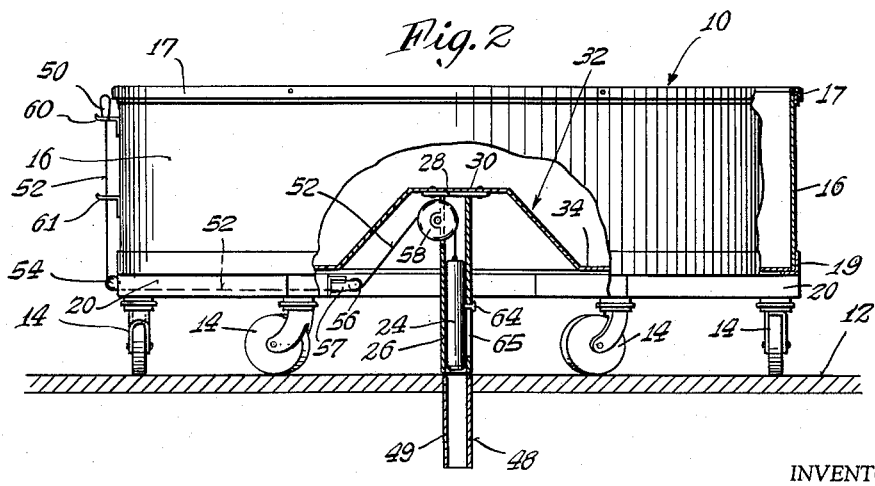
FIG. 2 is a view partly in side elevation and partly in vertical section of the carrier structure, together with a vertical sectional view of a supporting floor construction.

Referring first to FIGS. 1 and 2, the improved carrier construction 10 of the invention as illustrated therein is generally round and large or expansive, being especially adapted to hold an appreciable amount of work. The carrier construction 10 as to its details may be fabricated in any desired manner, as for example from stiff sheet metal, smooth wood, plastic-covered wood or metal, or the like. Any suitable structural or reinforcing means may be provided for the panels or walls thereof, to support the same in a manner suitable for the loads which are to be carried.

The rotary carrier 10 includes a receptacle or support means in the form of a tray which is carried in a raised, level position, in accordance with the present invention, on a floor surface such as provided by the floor 12 in FIG. 2, for both turning and translational movement over the same, and is provided with a novel rotary anchorage means by which it may be anchored to one section of the floor 12 while being freely rotatable about a central vertical axis. In accomplishing this, I provide as shown a large round receptacle or tray having a plurality of casters 14 disposed about a central vertical axis of the receptacle as clearly seen in FIGS. 2 and 3. Preferably the casters 14 are mounted along the lower edge of a cylindrical side wall 16 of the receptacle. The circular wall 16 may be constituted of any suitable material, and is shown as constructed of heavy gage sheet metal formed into a short, large-diameter cylinder disposed in an upright position.

The upper edge of the side wall 16 may have a suitable rubber, plastic or equivalent molding or edging 17 secured to it, and such edging may be so constituted that it protects the arms of personnel working at the carrier 10 from being scratched by the top of the wall 16. The lower edge of the wall 16 may be provided with a circular frame 19, which may be advantageously constituted of structural iron having an angle-section whereby it has a desirable rigidity.

As seen in FIGS. 2 and 3, the circular frame 19 may be further strengthened and reinforced by a plurality of struts 20 of angle iron or other suitable structure, such struts being arranged as chords and forming a regular polygonal figure, shown here as a hexagon.

With such construction the casters 14 may be advantageously secured to the points or apices of the hexagonal frame formed by the struts 20. Thus, six of the casters 14 would be utilized to support the carrier receptacle in its spaced, level position above the floor 12.

By the above construction the carrier or tray thus formed may be readily, quickly rolled across the floor to any desired location, and may have rotary movement as well as translational movement, as it well understood from the action of the casters 14.

According to the invention, I provide below the carrier structure or receptacle and mounted under the center portion thereof substantially centrally of the casters 14 a novel, rotary anchorage means by which the carrier may be affixed to a certain part of the floor 12 and prevented from having translational movement while at the same time being freely rotatable about a central, vertical axis. Referring to FIG. 2, such rotary anchorage means is shown as constituted of a movable pivot member 24 in the form of a solid, round elongate bar, said bar being slideably vertically mounted in a tubular bearing member 26 which is affixed to the receptacle and depends therefrom to a point closely adjacent the top surface of the floor 12. The tubular bearing 26 may be fastened in any suitable manner. As shown herein it is mounted on a transverse mounting or base plate 28 which is secured to a flat top portion 30 of a truncated conical supporting means 32 which can constitute a portion of the circular bottom plate 34 of the receptacle. Thus the receptacle which constitutes a major portion of the carrier structure 10 is formed essentially of the cylindrical side wall 16 and circular bottom plate 34.

Referring to FIGS. 2 and 3, the bottom plate 34 may be secured along its periphery to the circular frame member 19, and may rest on the chord like struts 20.

The tubular bearing 26 is further supported by radial struts 36, 37 and 38 which are fastened to the bearing intermediate its ends and which extend to a rectangular frame 39 constituted of elongate side members 40 and cross members 42, the latter being attached to the side members 40 at points spaced from the extremities thereof. A diagonal brace member 44 is also carried by the rectangular frame, and has attached to it one of the radial struts 38 as clearly seen in FIG. 3. The purpose of the diagonal frame member 44 will hereinafter be described in detail.

A pair of radially extending struts 46 may be additionally provided, secured between the sides 40 of the rectangular frame 39 and extending to opposite apices of the hexagonal framework constituted by the chord-like struts 20. By such construction additional support is provided for the bottom member 34 of the receptacle, and also the tubular bearing 26 is rigidly supported in a vertical position below the central portion of the receptacle.

Further, in accordance with the invention, I provide a simple and conveniently operable means by which the pivot member 24 may be moved vertically between raised and lowered positions for the purpose of anchoring the carrier structure to the floor 12 at a certain location for solely rotary movement, or else freeing the carrier structure so that it may be rolled over the floor with translational and/or rotary movement. As seen in FIG. 2, the floor 12 is provided with an opening 48, shown below the anchor member 24, and said opening may be defined by a tubular member or bushing 49, which is mounted in the floor 12 in any suitable manner. The bushing 49 has a bore which is sufficiently large to readily slidably receive the pivot member or bar 24 when the latter is lowered so as to project downward out of the tubular bearing 26. Thus, when the pivot member 24 is lowered and disposed in both the tubular bearing 26 and the floor bushing 49 it constitutes a pivot pin, acting as a bearing stud about which the carrier structure may be readily rotated while at the same time such structure is held captive at the said location on the floor and prevented from having translational movement.

I effect the lowering and raising of the pivot member or bar 24 by a novel and simple actuating means which is under the control of a handle 50 disposed at the side of the receptacle and movable between raised and lowered positions corresponding respectively to the raised and lowered positions of the pivot bar 24. As shown in FIGS. 1 and 2 the handle 50 is connected with a strong, flexible cable 52 which extends downwardly from the handle and passes over a pulley 54 mounted on the circular frame member 19. The cable 52 extends radially inward from the pulley 54 and passes over another pulley 56 which is mounted on a bracket 57 secured to the diagonal frame member 44. Such frame member is so located as to conveniently position the pulley 56 for engagement by the cable 52 as the latter is brought radially inward from the pulley 54. A third and larger pulley 58 is provided, preferably carried by the tubular bearing 26 and so arranged that the cable 52 may pass over and around the pulley 58 and downward along the axis of the tubular bearing to the upper extremity of the pivot bar 24, to which it is securely attached. On the outside of the depending skirt 16 I provide a pair of angle brackets 60 and 61, disposed one above the other and having slotted horizontal portions adapted to receive the pull cable 52. The handle 50, as seen in FIG. 2, may rest on one or the other of said horizontal portions, and accordingly the said handle may occupy either a raised position as shown in the figure or else a lowered position wherein it rests on the bracket 61. Such lowering movement of the handle 50 will permit the pivot bar 24 to drop downward under its own weight, whereby it will project downward from the tubular bearing 26 and may be disposed within the bushing 49. When in this lowered position the pivot bar 24 functions as a vertical pivotal axis about which the carrier structure may be freely rotated while being supported by the casters 14. The carrier structure may not be translationally moved, however, when the pivot bar 24 is in this lowered position, and such translational movement may be effected only after first raising the handle 50 to the position shown in FIG. 2, wherein the bar 24 is again raised and clears the floor bushing 49.

For thep urpose of preventing turning of the pivot bar 24 in the tubular bearing 26, which turning might twist or shear off the cable 52, the bar 24 is provided with a lateral pin 64 which extends into an elongate vertical slot 65 in the tubular bearing 26. Thus, the bar 24 may have limited vertical movement between its operative and inoperative positions while at the same time being prevented from turning in the bearing 26.

My improved wheeled, laterally movable and anchorable rotary carrier as above constructed will be found useful wherever goods or merchandise must be transported across a floor, or else shifted between various positions at one general location on the floor.

For example, in the handling of linens, laundered or washed fabrics and the like, the carrier structure may be located under a chute and anchored to the floor as such location, whereby it can receive goods from the chute and can remove such goods from a position directly under the chute to other positions conveniently located for personnel who are to perform operations on the goods. Such a carrier structure saves a great deal of handling and walking on the part of the personnel, and greatly facilitates the handling of various items.

Moreover, whenever it is so desired, the carrier structure may be released from its anchored position and moved across the floor to other locations, to suit the various operations and procedures required in handling and/or processing the particular goods being worked on.

The carrier structure is seen to be relatively simple in its construction, strong and durable, and rugged so as to withstand severe conditions of use. Moreover, the operations required to anchor the carrier structure or release the same from its anchorage are simple and easily carried out.

Variations and modifications may be made within the scope of the claims, and portions of the improvements may be used without others.

I claim:
1. A wheeled, laterally movable, anchorable rotary carrier means for supporting and carrying laundry or the like, comprising a genarally round, low, expansive carrier tray adapted to hold work, said tray having a large, freely accessible top opening and upstanding side walls, and having a bottom wall extending inward from the lower portions of the side walls, said bottom wall having an appreciably raised center portion providing a space below the bottom wall; means including a plurality of casters disposed about and spaced from the vertical axis of the center portion of said carrier tray for supporting the latter in raised, level position on a floor for both turning and translational movement over the same; a rotary anchorage means mounted in the said space under the center portion of said bottom wall carrier tray and disposed substantially centrally of said casters, said means including a pivot bar and means mounting said bar for lowering and raising movement respectively into and out of engagement with an opening in the floor, thereby to enable the said carrier tray to be either rotated about the said anchorage means at one location on the floor or else rolled over the floor to different locations thereon and means remote from said pivot bar and from the longitudinal axis thereof, for raising and lowering the said bar.

2. The invention as defined in claim 1, in which there are manually operable means attached to the side walls of said carrier tray for actuating the pivot bar raising and lowering means to raise and lower the bar.

3. The invention as defined in claim 2, in which the manually operable means comprises a handle movably mounted on a peripheral portion of the carrier tray and movable between lowered and raised positions to respectively lower and raise the said pivot bar.

4. The invention as defined in claim 3, in which the said bar raising and lowering means includes a flexible cable connected between the handle and the said pivot bar, and pulleys around which the cable extends.

5. The invention as defined in claim 1, in which the pivot bar comprises an elongate, round bar longitudinally, vertically slidable between raised and lowered positions below the center portion of the bottom wall of the tray.

6. The invention as defined in claim 5, in which the means mounting the said pivot bar comprises a vertically disposed tubular bearing for said bar, enclosing and slidably mounting the latter.

7. The invention as defined in claim 6, in which the center portion of the bottom wall comprises a frusto-conical shell to which the tubular bearing is attached and from which it depends, and in which there are struts extending from the base of said shell to the tubular bearing to brace the latter and hold it rigidly in place.

8. The invention as defined in claim 5, in which the mounting means includes a tubular bearing member slidably carrying the said pivot bar, said bearing member having a vertical, elongate slot and said bar having a lateral projection extending into said slot, thereby to prevent relative turning between the bar and tubular bearing member.

9. The invention as defined in claim 1, in which the side walls of the carrier tray are cylindrical, and in which the said casters are mounted along the bottom edge of said walls.

10. The invention as defined in claim 9, in which there is a framework comprising a plurality of elongate interconnected struts joined to and extending between the lower edge portions of the said side walls.

11. The combination of a floor having an opening therein; and a wheeled, laterally movable, anchorable rotary carrier means for supporting and carrying laundry or the like, comprising a generally round, low expansive carrier tray adapted to hold work, said tray having a circular bottom wall the center portion of which is appreciably raised to provide a space below the bottom wall; means including a plurality of casters disposed about and spaced from the vertical axis of the center portion of said carrier tray for supporting the latter in raised, level position on the floor for both turning and translational movement over the same; a rotary anchorage means mounted in the space under the said center portion of the bottom wall of said carrier tray and disposed substantially centrally of said casters, said means including a pivot bar and means mounting said bar for lowering and raising movement respectively into and out of the hole in the floor, thereby to enable the said carrier tray to be either rotated about the said anchorage means at the location of said hole or else rolled over the floor to different locations thereon; and means remote from said pivot bar and from the longitudinal axis thereof, for raising and lowering the said bar.

12. The invention as defined in claim 11, in which there is a tubular bearing mounted in the said floor and defining the opening thereof, said bearing being adapted to receive the said pivot bar when the latter is in its lowered position.

References Cited in the file of this patent

UNITED STATES PATENTS

| | | |
|---|---|---|
| 675,405 | Paul | June 4, 1901 |
| 1,148,281 | Becker | July 27, 1915 |
| 1,421,110 | Thusen | June 27, 1922 |
| 1,641,651 | Wulf | Sept. 6, 1927 |
| 2,417,031 | Witherell | Mar. 4, 1947 |
| 2,588,990 | Sanchez | Mar. 11, 1952 |
| 2,590,382 | Danielson | Mar. 25, 1952 |
| 2,747,692 | Holmes | May 29, 1956 |
| 2,789,708 | Payne | Apr. 23, 1957 |